May 6, 1969

K. ADAMS 3,442,488

VALVE

Filed March 8, 1966

Inventor:
Karl Adams
By
Michael J. Striker
his Attorney

United States Patent Office 3,442,488
Patented May 6, 1969

3,442,488
VALVE
Karl Adams, Im Pastoratsbusch 102,
Bochum-Stiepel, Germany
Filed Mar. 8, 1966, Ser. No. 532,769
Claims priority, application Germany, Mar. 23, 1968,
A 48,710
Int. Cl. F16k 1/226
U.S. Cl. 251—305                                16 Claims

ABSTRACT OF THE DISCLOSURE

A value of the tilt variety having an improved seating surface for the resistance of wear. A tubular housing has disposed therein an annular female valve seat defining a segment of a cone. A flap having its periphery complemental to the seat is mounted by transverse pivots in the housing, the axis of the pivots being eccentric with respect to the housing and seat. That portion of the seat surface located the greatest distance from the pivotal axis is inclined at an acute angle exceeding 3° relative to the tangent defined by the arcuate path of a complemental point on the flap surface as the flap moves immediate the closed position. That portion of the seat 180° opposite the point of greatest distance from the pivot axis defines a second acute angle with a complemental portion of the flap as the flap moves immediate the closest position, this latter acute angle being larger than the first acute angle.

---

Figure 1:
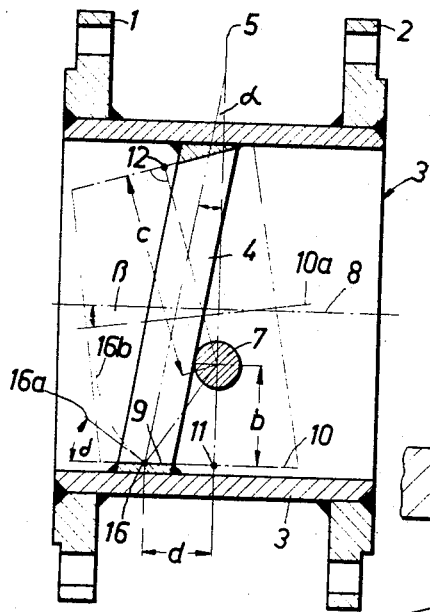

The present invention relates to valves in general, and more particularly to improvements in valves which may be utilized as shutoff valves or check valves. Still more particularly, the invention relates to so-called tilt valves wherein a valve member resembling a flap or disk is tiltable about the axis of an eccentric pivot which traverses the valve body and may be moved into and away from sealing engagement with the internal surface of an inclined annular valve seat.

It is already known to utilize a tilt check valve or a tilt shutoff valve in water mains and similar pipe lines of large internal diameter. In such valves, the flap and, as a rule, the larger wing thereof has a sliding fit which is considered to be advantageous because the main closing or sealing pressure is transmitted to the sealing surface where the effort arm of the flap assumes a maximum value. However, such configuration of the flap brings about serious problems when the sealing portion of the flap begins to wear away because, in the region of the sliding fit, the valve begins to leak and the leakage increases with progressing wear. This is highly undesirable, particularly in pipe lines wherein the valve is not readily accessible or wherein the replacement of a valve, or of certain components of the valve, would necessitate complete shutdown of a large installation. In such pipe lines, the valves should be constructed with a view to insure that their life expectancy equals the life expectancy of the remaining parts. Furthermore, a valve whose valve member has a sliding fit in its seat is likely to jam in response to changes in temperature.

Accordingly, it is an important object of my present invention to provide an improved tilt valve which is constructed and assembled in such a way that its valve member (i.e., a rockable disk or flap) is not likely to jam in response to changes in temperature and that such valve member will not permit leakage of fluid despite the fact that its sealing element or elements will wear away in response to repeated engagement with and disengagement from the valve seat.

Another object of the invention is to construct the valve seat of a tilt valve in such a way that it can cooperate with a tiltable flap to insure proper sealing action despite the fact that the abutting surfaces of the seat and valve member will wear away on prolonged use of the valve.

An additional object of the invention is to provide a novel valve member which may be utilized in a tilt valve of the above outlined characteristics.

Briefly stated, one feature of my present invention resides in the provision of a tilt valve which comprises a tubular housing having a cylindrical internal surface and accommodating an annular metallic valve seat whose internal sealing surface forms part of a conical surface and whose axis makes an acute angle with the axis of the valve housing. The valve further comprises transverse pivot means whose axis crosses in space and is normal to the axis of the housing adjacent to the larger-diameter end of the sealing surface, and a valve member or flap supported by and tiltable about the axis of the pivot means to move its circumferentially extending sealing element into and from sealing engagement with the internal surface of the seat. The configuration of the internal surface and of the flap are such that, in response to tilting of the flap into sealing engagement with the seat, the flap is wedged into the seat along that zone of the internal surface which is located at a maximum distance from the axis of the pivot means, i.e., the larger wing of the flap does not have a sliding fit and the wear on its sealing element will not result in leakage.

The above requisites are met if the valve is constructed as follows: A plane which includes the axis of the housing and is normal to the axis of the pivot means must intersect the conical surface along two lines one of which is parallel with the axis of the housing and includes that point of the conical surface which is nearest to the axis of the pivot means. The other line includes that point of the conical surface which is located at a maximum distance from the axis of the pivot means. The annular sealing element of the flap has a first reference point which travels in an arcuate path when the flap is tilted and is located on the other line when the flap is moved to sealing position. A line extending tangentially of the aforementioned arcuate path and passing through the first reference point makes with the other line a small acute angle which is preferably between 3–15 degrees and is a small fraction of a second acute angle enclosed by the one line with a tangent passing through a second reference point of the sealing element which is located on the one line in the sealing position of the flap.

Figure 2:
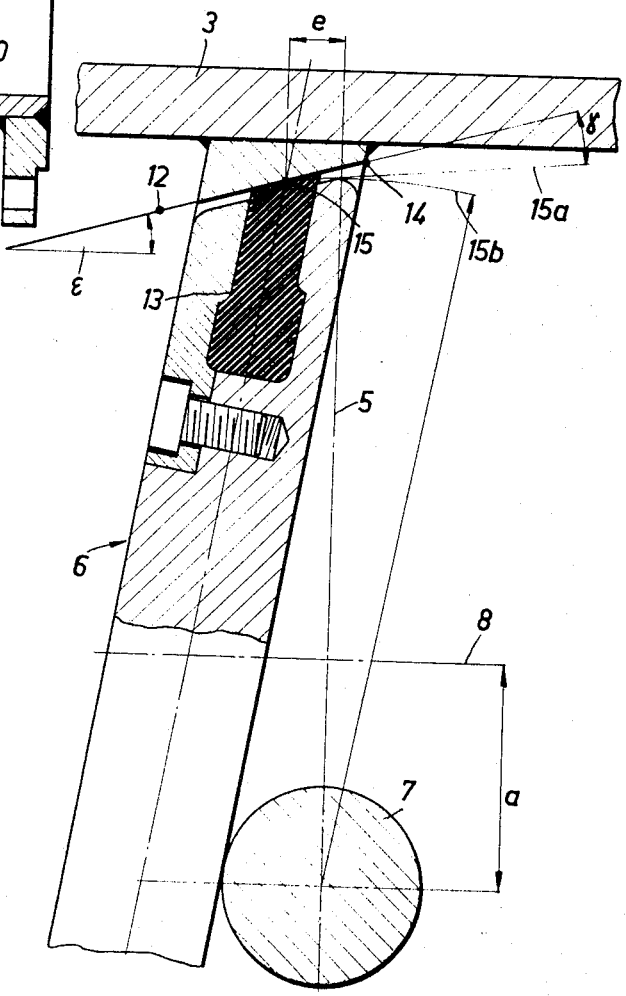

The novel features which are considered as characteristic of the invention are set forth in particular in the appended claims. The improved tilt valve itself, however, both as to its construction and its mode of operation, together with additional features and advantages thereof, will be best understood upon perusal of the following detailed description of a specific embodiment with reference to the accompanying drawings, in which:

FIG. 1 is an axial section through a tilt check valve which embodies my invention, the flap having been omitted for the sake of clarity; and FIG. 2 is an enlarged view of a detail of the valve, the flap being shown in sealing position.

Referring to the drawings in detail, the improved valve comprises a cylindrical body or housing 3 having flanges 1 and 2 by means of which the housing can be installed between two sections of a pipe line. The housing 3 accommodates a metallic annular valve seat 4 which is inclined with reference to a transverse plane 5 in such a way that its own plane makes with the plane 5 an angle alpha of about 10 degrees. The plane 5 is normal to the axis 8 of the housing 3 and includes the axis of an eccentric pivot shaft 7 which supports a valve member or flap 6. The shaft 7 extends transversely of the housing 3 and is eccentric with reference thereto, i.e., the axis of the shaft 7 does not extend diametrically of the housing but is normal to and crosses in space the axis 8. The distance *a* indicates in FIG. 2 the eccentricity of the shaft 7 and corresponds to the distance between the axis 8 and the pivot axis of the flap 6.

The internal surface 9 of the annular seat 4 is finished with at least some precision and resembles a portion of a conical surface 10 whose axis 10*a* makes with an axis 8 an angle beta shown in FIG. 1. The configuration of the internal surface 9 must be selected in such a way that it meets the following requirements:

As viewed in a plane which is normal to the plane 5 and includes the axis 8 (i.e., in the plane of FIG. 1 or 2), the minimum distance *b* between the axis of the pivot shaft 7 and the nearest point 11 of the conical surface 10 must be located on a line of the surface 10 which is parallel with the axis 8. In other words, the line along which the plane of FIG. 1 intersects the conical surface 10 closest to the axis of the shaft 7 must be parallel to the axis 8 of the housing 3.

The other requirement to be met in selecting the internal sealing surface 9 of the seat 4 is that the aforementioned plane of FIG. 1 or 2 should intersect the conical surface 10 along a second line (including the point 12) which is located at a maximum distance *c* from the axis of the pivot shaft 7 and makes an acute angle gamma with a line 15*a* which is tangential to the arcuate path of a reference point 15 on an annular sealing element 13 recessed into the circumference of the flap 6. FIG. 2 shows that the angle gamma is enclosed by a line passing through the point 12 in the plane of FIG. 2 and the line 15*a* passing through the reference point 15 on the periphery of the sealing element 13 and extending tangentially of the arcuate path 15*b* defined by the point 15 when the flap 6 is caused to turn about the axis of the pivot shaft 7. The reference point 15 is located in a plane which halves the sealing element 13 and is normal to its axis. When the valve of my invention is a check valve, the angle gamma may be about 10 degrees. This angle gamma is only a small fraction of an angle delta enclosed in the plane of FIG. 1 between a line located on the conical surface 10 and passing through the point 11 and a line 16*a* which is tangential to the arcuate path 16*b* of a second reference point 16 on the periphery of the sealing element 13. In the illustrated embodiment, the angle delta equals about three angles gamma. When the flap 6 is moved to sealing position, the reference points 15 and 16 are located on the lines along which the plane of FIG. 1 or 2 intersects the conical surface 10.

The conicity of the conical surface 10 is determined by an angle eta which equals two angles beta. The angle eta is enclosed by the aforementioned line passing through the point 12 and a line which is parallel with the axis 8 of the housing 3. The magnitude of this angle eta depends from the angle gamma (see FIG. 2), and the magnitude of the angle gamma depends on the position of the pivot shaft 7 as seen in the axial direction of the housing 3. The plane 5 which is normal to the axis 8 of the housing 3 and includes the axis of the pivot shaft 7 should intersect the internal surface 9 of the seat 4 along a line including a point 14 which is located at a maximum distance (or almost at a maximum distance) from the axis 8 of the housing 3. In the illustrated embodiment, the point 14 is close to the line where the plane 5 intersects the sealing surface 9. The magnitude of the angle gamma is further influenced, to a certain degree, by the eccentricity *a* of the pivot shaft 7. In the FIGS. 1 and 2, the eccentricity *a* is rather large because the valve is assumed to constitute a check valve. If the flap 6 is to be moved to and from sealing position in response to outside torque transmitted to the pivot shaft 7, i.e., if the valve is to be used as a shutoff valve, superior sealing action will be achieved if the eccentricity *a* is not less than a predetermined minimum value. Such eccentricity is of lesser importance for the function of the valve when the latter is used as a shutoff valve.

The eccentricity *a* need not increase proportionally with the internal diameter of the housing 3. For example, the eccentricity *a* will be about 15 mm. for a housing with an internal diameter of 100 mm. but may be only about 30 mm. in a housing whose internal diameter is in the range of 2,000 mm.

Once the angle gamma is selected, the angles beta and eta can be determined by following the preceding part of this disclosure.

It is desirable to select the same type of conical surface 10 for all sizes of valves, regardless of their intended use. A conical surface 10 with a ratio of 1:5 has been found to be very satisfactory. The angle gamma is then a resultant angle and should be at least 3 degrees but preferably not more than 15 degrees. If the angle gamma is less than 3 degrees, the sealing element 13 (in the region of the reference point 15 shown in FIG. 2) will have a sliding fit which is undesirable. If the angle gamma exceeds 15 degrees, the ratio of its size to the size of the angle delta is relatively small so that, in the region of the point 11, the surface 9 does not take up all or nearly all sealing stresses. On the other hand, that zone of the surface 9 which is adjacent to the point 11 is especially suited to take up sealing stresses because the effort arm *d* is very long and the touchdown angle is also very large. In the illustrated embodiment, the angle delta is about 35 degrees.

If the sealing pressure in the region of the reference point 15 (where the effort arm *e* is small) is very large, the moments at this point will be excessive and can cause overstressing of the valve as well as jamming. Such jamming should not be confused with jamming of valve members having a sliding fit because the latter jamming is due mainly to changes in temperature. The improved valve is substantially immune to thermally induced jamming.

When the valve remains in use for long periods of time and the flap 6 is moved frequently to and from sealing position in which it transmits to the surface 9 considerable sealing stresses, such stresses are felt particularly in the region of the reference point 16 which is subjected to maximum wear and, with time, allows for excessive turning of the flap, i.e., the illustrated portion of the sealing element 13 then moves to the left and beyond the desirable optimum sealing position of FIG. 2. While the friction between the sealing element 13 and the zone adjacent to the point 16 of the surface 9 is substantially zero, the friction in the region of the point 15 is much higher so that the corresponding portion of the sealing element 13 wears away more rapidly with the result that the sealing element invariably undergoes at least some compression when the flap 6 is moved to sealing position. The compression can decrease to zero only if a sealing element has a mere sliding fit in the seat, i.e., if it is not wedged into the internal surface of the seat. The absence of a sliding fit constitutes an important feature of my valve because, sooner or later, a sealing element which is slidable in its seat will be unable to prevent leaks as the wear progresses.

The angle alpha (inclination of the seat 4 with reference to the plane 5) can be varied within certain limits without departing from the spirit of my invention. If the angle alpha is smaller, the effort arm *d* is also smaller so that the lower zone of the sealing surface 9 does not take up all or nearly all such sealing stresses which are transmitted to the seat 4 by the flap 6 when the latter moves to its sealing position.

What is claimed as new and desired to be protected by Letter Patent is:

1. A valve comprising: a tubular housing; an annular female valve seat defining the segment of a cone mounted in said housing located in a plane which is inclined with reference to a second plane making a right angle with the axis of said housing; transverse pivot means in said housing adjacent said seat and disposed closer to one side of the housing than the opposite side thereof; a flap having its periphery formed complemental to said seat and rotatable about said pivot means from a cooperative nested position against said seat to an open position approaching parallel to the axis of said housing; a plane through said pivotal axis parallel to the axis of said tubular housing dividing said seat into a short segment and a long segment; a first portion of the conical surface of the seat located the greatest distance from the pivotal axis being inclined at a first acute angle exceeding 3° relative to the tangent defined by the arcuate path of a complemental point on the flap surface as the flap moves immediate the cooperative nested position and a second portion of the conical surface of said seat located 180° opposite from said first portion having a second acute angle with the tangent defined by the arcuate path of a second complemental point on the flap surface as the flap moves immediate the cooperative nested position; said first acute angle being smaller than said second acute angle, whereby said long segment of the flap wedges into seating engagement and the short segment is seated under compression against the seat when the said flap is rotated about said pivotal axis to said closed position.

2. A valve according to claim 1 wherein: said second acute angle is approximately three times larger than said first angle.

3. A valve according to claim 1 and wherein: a plane which includes the axis of said housing and is normal to the axis of said pivot means intersects said conical surface along two lines, one of which lines includes that first portion of said valve seat, the other of which includes that second portion of said valve seat.

4. A valve according to claim 1 and wherein: said first acute angle is in the range between 3 and 15 degrees.

5. A valve according to claim 1 and wherein: a plane including the axis of said pivot means and normal to the axis of said housing intersects said conical surface defining said seat along said long segment.

6. A valve according to claim 1 and wherein: the ratio of said conical surface is five to one.

7. A valve according to claim 1 and wherein: the shortest distance between the axis of said pivot means and the axis of said housing is between 14 and 30 mm. and wherein the internal diameter of said tubular housing is between 100 and 2000 mm.

8. A valve according to claim 1 and wherein: said pivot means is adjacent to the large diameter end of said internal surface.

9. A valve comprising: a tubular housing defining a segment of a cylinder; an annular female valve seat defining the segment of a cone mounted in said housing; transverse pivot means in said housing adjacent said seat and disposed closer to one side of the housing than the opposite side thereof; a flap having its periphery formed complemental to said seat and rotatable about said pivot means from a cooperative nested position against said seat to an open position approaching parallel to the axis of said housing; a plane through said pivotal axis parallel to the axis of said tubular housing dividing said seat into a short segment and a long segment; the apex of said cone being located on a line which is parallel to the axis of said cylinder and includes the full axial extent of the surface of said short segment of said conical surface furthest removed from said pivot axis; said cone further including a line on said long segment of said conical surface furthest removed from said pivot axis inclined at a first acute angle exceeding 3° relative to the tangent defined by the arcuate path of a complemental point on the flap surface as the flap moves immediate the cooperative nested position, whereby said long segment of the flap wedges into seating engagement and the short segment is seated under compression against the seat when the flap is rotated about said pivotal axis to said closed position.

10. A valve according to claim 9 and wherein: said annular female valve seat is located in a plane which is inclined with reference to a second plane making a right angle with the axis of said cylinder and including the axis of said pivot means.

11. A valve according to claim 9 and wherein: a plane which includes the axis of said housing and is normal to the axis of said pivot means intersects said conical surface along two lines, both of which lines when extended converge at the apex of said cone.

12. A valve according to claim 9 and wherein: said first acute angle is in the range between 3 and 15 degrees.

13. A valve according to claim 9 and wherein: a plane including the axis of said pivot means and normal to the axis of said cylinder intersects said segment of said conical surface defining said seat along said long segment.

14. A valve according to claim 9 and wherein: the ratio of said conical surface is 5 to 1.

15. A valve according to claim 9 and wherein the shortest distance between the axis of said pivot means and the axis of said housing is between 15 and 30 mm. and where the internal diameter of said housing is between 100 and 2000 mm.

16. A valve according to claim 9 and wherein: said pivot means is adjacent to the range diameter end of said internal surface.

References Cited

UNITED STATES PATENTS

| | | | |
|---|---|---|---|
| 2,095,263 | 10/1937 | Moss | 251—305 X |
| 2,711,188 | 6/1955 | Nickerson | 137—527.8 |
| 2,750,955 | 6/1956 | Bredtschneider et al. | 137—527.8 X |
| 2,923,523 | 2/1960 | Taylor | 251—306 X |
| 3,078,069 | 2/1963 | Broadbent | 251—305 X |
| 3,275,289 | 9/1966 | Fawkes | 251—306 |
| 3,327,732 | 6/1967 | Deve | 137—527.8 |

FOREIGN PATENTS 302,526  12/1928  Great Britain.

M. CAREY NELSON, *Primary Examiner.*

ROBERT C. MILLER, *Assistant Examiner.*

UNITED STATES PATENT OFFICE

CERTIFICATE OF CORRECTION

Patent No. 3,442,488  Dated: May 6, 1969

INVENTOR Karl Adams  Assignee: None

It is certified that error appears in the above-identified patent and that said Letters Patent are hereby corrected as shown below:

Column 1, Line 6, the numbers "1968" should be deleted and "1965" inserted in its place.

Signed and sealed this 28th day of March 1972.

(SEAL)
Attest:

EDWARD M. FLETCHER, JR.
Attesting Officer

ROBERT GOTTSCHALK
Commissioner of Patents